(12) United States Patent
Reiff

(10) Patent No.: US 6,217,248 B1
(45) Date of Patent: Apr. 17, 2001

(54) QUICK-CHANGE WINDING FORM ASSEMBLY

(75) Inventor: Duane W. Reiff, Huber Heights, OH (US)

(73) Assignee: Globe Products Inc., Huber Heights, OH (US)

( * ) Notice: Subject to any disclaimer, the term of this patent is extended or adjusted under 35 U.S.C. 154(b) by 0 days.

(21) Appl. No.: 09/294,924

(22) Filed: Apr. 19, 1999

Related U.S. Application Data

(60) Provisional application No. 60/082,390, filed on Apr. 20, 1998.

(51) Int. Cl.[7] .............................. H02K 15/09; F16B 5/10
(52) U.S. Cl. ......................... 403/24; 403/348; 403/350; 242/433.4
(58) Field of Search ................................... 403/348, 349, 403/350, 327, 96, 92, 24; 242/433.4

(56) References Cited

U.S. PATENT DOCUMENTS

| | | |
|---|---|---|
| 4,385,577 | 5/1983 | Graham . |
| 4,773,788 | 9/1988 | Ruhl . |
| 4,786,004 | 11/1988 | Boers . |
| 4,830,297 | 5/1989 | Walton et al. . |
| 5,143,468 | 9/1992 | Pausch . |
| 5,255,994 | 10/1993 | Stein . |
| 5,257,745 | 11/1993 | Lombardi et al. . |
| 5,437,515 | 8/1995 | Kuramoto et al. . |
| 5,688,030 | 11/1997 | McAnally et al. . |

FOREIGN PATENT DOCUMENTS

WO 97/39275   10/1997   (WO) .

*Primary Examiner*—Harry C. Kim
(74) *Attorney, Agent, or Firm*—Roger S. Dybvig

(57) ABSTRACT

An improved quick-change winding form assembly in which the support is divided into two parts, one part comprising a bearing collar, being connected to a bearing at the front of the flier assembly, and the other part comprising a mounting plate connected to the winding form or shroud. A pair of bayonet pins having enlarged heads is carried by the bearing collar and engages a pair of arcuate key slots extending through the mounting plate. The bayonet pins engage the arcuate key slots when the bearing collar is rotated relative to the mounting plate until a pair of spring biased balls mounted on the bearing collar enter recesses in the rear face of the mounting plate. Disassembly can be accomplished by simply rotating the winding form with its attached mounting plate in the opposite direction while holding the bearing collar fixed.

8 Claims, 2 Drawing Sheets

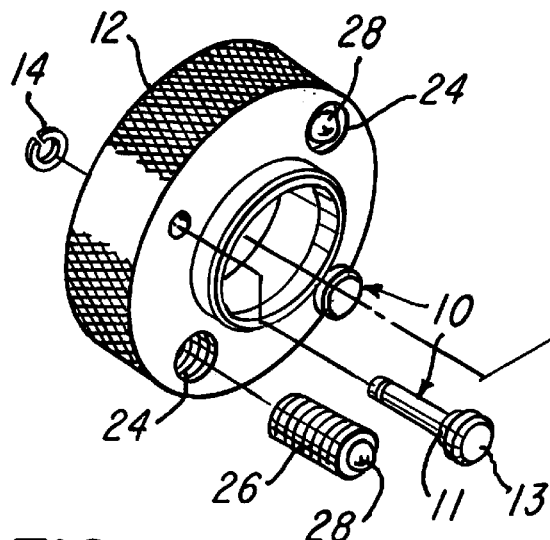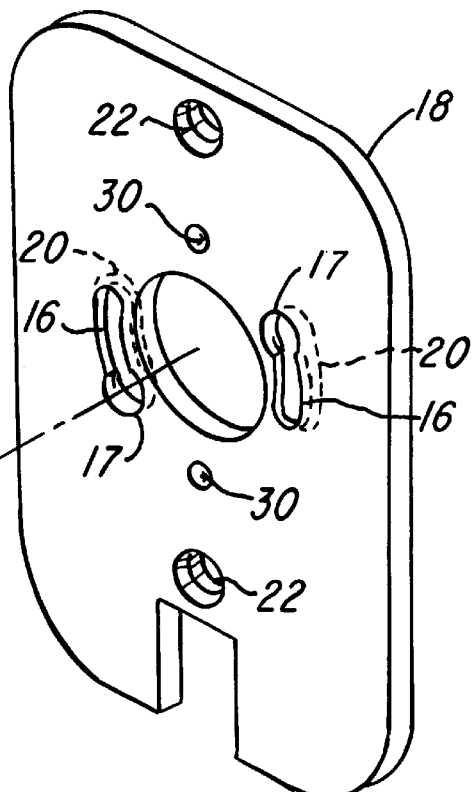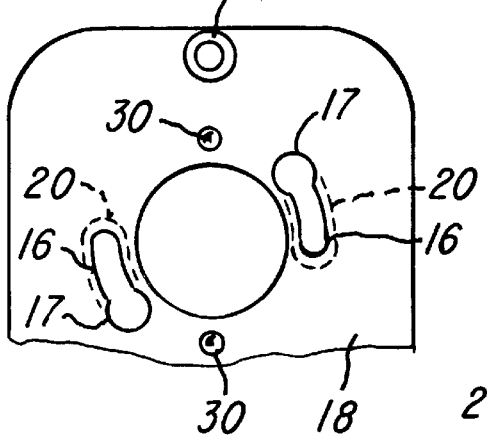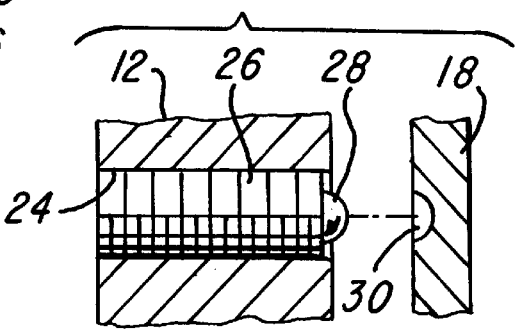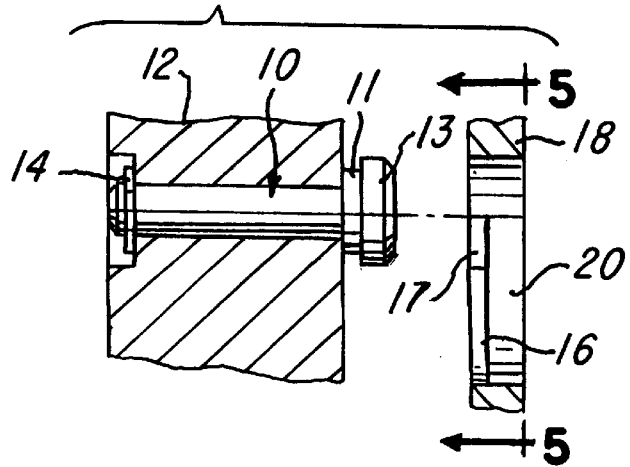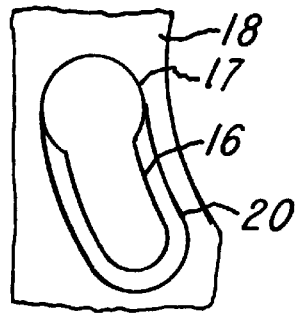

QUICK-CHANGE WINDING FORM ASSEMBLY

CROSS REFERENCE TO RELATED APPLICATIONS

This application claims the benefit of U.S. Provisional Application Ser. No. 60/082,390 filed Apr. 20, 1998.

FIELD OF THE INVENTION

This invention relates to a quick-change winding form assembly especially for use with flier-type armature winding machines.

INCORPORATION BY REFERENCE

The disclosures of U.S. Pat. No. 4,830,297 to Walton et al., U.S. Pat. No. 5,257,745 to Lombardi et al., and PCT patent application number WO 97/39275 of Globe Products Inc. are hereby incorporated by reference herein.

BACKGROUND OF THE INVENTION

Various quick-change winding form assemblies for use in flier-type armature winding machines have been developed including, for example, the winding form assemblies shown in the aforementioned Walton et al. U.S. Pat. No. 4,830,297 and the aforementioned Lombardi et al. U.S. Pat. No. 5,257,745. FIGS. 22, 23 and 24 of the Lombardi et al. '745 patent, show an embodiment of a quick-change shroud or winding form arrangement in which a winding form is provided with a dovetail-shaped keyway that receives a key on a support for the shroud so that the shroud may be slid horizontally onto the support. A pair of spring-biased balls connected to the support extend into recesses in the rear surface of the shroud to provide a detent action to releasably locate the shroud in its desired working location. The balls may help take the "play" or looseness out of the connection between the keyway on the shroud and the key built into the support. One disadvantage of this construction is that the shrouds must all be machined to be provided with the dovetail key and the recesses.

SUMMARY OF THE INVENTION

This invention is directed to an improved quick-change winding form assembly in which the support is divided into two parts, one part comprising a bearing collar, being connected to a bearing at the front of the flier assembly, and the other part comprising a mounting plate connected to the winding form or shroud. The two support parts can be quickly assembled together by aligning the enlarged ends of a pair of arcuate key slots extending through the mounting plate with the heads of a pair of bayonet pins carried by the bearing collar, pushing the winding form with its attached mounting plate toward the bearing housing and, while holding the bearing collar in a fixed orientation, rotating the winding form until a pair of spring biased balls mounted on the bearing collar enter recesses in the rear face of the mounting plate. Disassembly can be accomplished by simply rotating the winding form with its attached mounting plate in the opposite direction while holding the bearing collar fixed. The diameters of the recesses are preferably sufficiently large that the balls can enter into the recesses without applying any pressure to the mounting plate. With such a construction, the spring pressure exerted against the balls can be so low that there is little resistance to the assembly or disassembly of the mounting plates and their associated winding forms. The mounting plates can be produced in large quantities and need not be custom-fitted to each winding form. In addition, because only light spring pressure is needed, there will be little wear on the connecting parts during use of the winding form and its mounting plate or during removal or replacement of the winding form.

BRIEF DESCRIPTION OF THE DRAWINGS

FIG. 1 is an exploded perspective view of a bearing collar and mounting plate in accordance with this invention.

FIG. 2 is a fragmentary elevational view of the mounting plate.

FIG. 3 is a fragmentary cross-sectional view showing a spring ball detent member in the bearing collar and a corresponding recess in the mounting plate.

FIG. 4 is a fragmentary cross-sectional view similar to FIG. 3 but showing a bayonet pin in the bearing collar and a corresponding key slot in the mounting plate.

FIG. 5 is a fragmentary elevational view of the rear of the key slot as viewed from arrows 5—5 of FIG. 4.

FIG. 6 also shows an armature located between the winding form assemblies.

DETAILED DESCRIPTION

Figure 6:
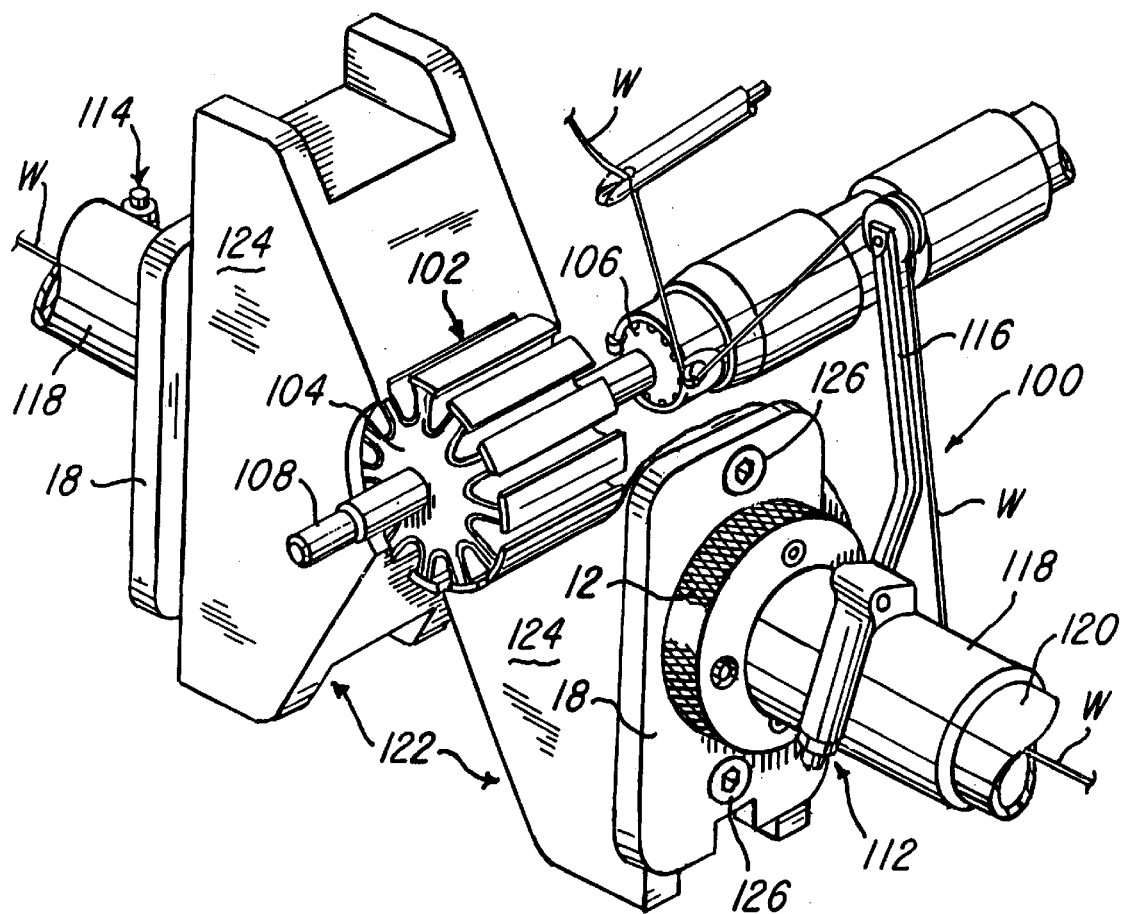
FIG. 6 is a simplified, fragmentary perspective view of a portion of a double flier armature winding machine provided with quick-change winding form assemblies made in accordance with the present invention.

FIG. 6 shows, in simplified form, an armature winding machine, generally designated 100, for winding an armature 102 having a coil-receiving core 104 and a commutator 106 mounted on an armature shaft 108.

The armature winding machine 100 includes right and left side flier assemblies 112 and 114, respectively, each having a flier or flier arm 116 affixed to a flier hub 118 that rotates with a hollow spindle 120 to draw wires W from suitable sources (not shown) of wire under tension. As well known, during the winding of the armature 102, the two flier spindles 120 are rotatably driven in mutually opposite directions by a suitable motor drive assembly and control circuitry therefor (not shown) during which time the wires W are drawn through the flier spindles 120 and wound into the armature core slots. During the winding operations, the wires W are guided into the armature core slots by left and right side winding form assemblies, generally designated 122, which include wire-engaging winding forms or wire guides or chucks 124.

Each of the two winding forms 124 is connected by screws 126 to a mounting plate 18 which is releasably connected to a bearing collar 12 affixed, as is conventional, to a stub shaft (not shown) at the free end of the flier hub 118. The screws 126 are received by countersunk bores 22 (FIG. 1) in the mounting plate 18. In accordance with this invention, the connection between the mounting plate 18 and the bearing collar 12 can be quickly released and reestablished by providing the bearing collar 12 with bayonet pins 10 and threaded ball spring ball detent members 26 that cooperate with parts of a mounting plate 18 as will now be described.

With reference to FIGS. 1 through 5, the bayonet pins 10 are held mounted to the bearing collar 12 by retaining rings 14. Each bayonet pin 10 includes a shoulder 11 and enlarged head 13. The heads 13 of the bayonet pins 10 are spaced apart from the front surface of the bearing collar 12 by shoulders 11. Arcuate key slots 16 extend through mounting plate 18 and releasably receive the bayonet pins 10 of bearing collar 12. The head 13 of each bayonet pin 10 is aligned and inserted into the enlarged opening 17 of each arcuate key slot 16. The sides of the arcuate key slots 16 in the mounting plate 18 are preferably relieved, as indicated at 20, to readily receive the heads 13 of the bayonet pins 10.

The bearing collar 12 has tapped holes 24 that receive threaded spring ball detent members 26 having balls 28 adapted to extend into recesses 30 in the rear face of the mounting plate 18 when the mounting plate 18 and the collar 12 are properly aligned. Therefore, the two support parts can be quickly assembled together by aligning the enlarged openings 17 of the pair of arcuate key slots 16 extending through the mounting plate 18 with the enlarged heads 13 of the pair of bayonet pins 10 carried by the bearing collar 12, pushing the winding form with its attached mounting plate 18 toward the bearing housing and, while holding the knurled bearing collar 12 in a fixed orientation, rotating the winding form until a pair of spring biased balls 28 mounted on the bearing collar 12 enter recesses 30 in the rear face of the mounting plate 18. The diameters of the recesses 30 are preferably sufficiently large that the balls 28 can enter into the recesses 30 without applying any pressure to the mounting plate 18 so there is little resistance to the assembly or disassembly of the mounting plates and their associated winding forms. Disassembly can be accomplished by simply rotating the winding form with its attached mounting plate 18 in the opposite direction while holding the bearing collar 12 fixed.

With reference to the aforementioned Walton et al. U.S. Pat. No. 4,830,297, generally speaking, the bearing collar 12 hereof replaces the Walton et al. hub 62 and the mounting plate 18 herein replaces the Walton et al. mounting plate 60.

Although the presently preferred embodiment of this invention has been described, it will be understood that within the purview of the invention various changes may be made within the scope of the following claims.

What is claimed is:

1. An armature winding machine comprising a flier assembly, a winding form, and a quick-change winding form assembly for removably mounting said winding form to said flier assembly, said quick-change winding form assembly comprising:

a bearing collar connected to said flier assembly comprising a first engagement surface, at least one ball detent connected to said collar and having at least one side surface of a ball which is partly extendable from said first engagement surface, and at least one engagement pin connected to said collar extending from said first engagement surface; and a mounting plate connected to said winding form and comprising a second engagement surface mutually confronting said first engagement surface and having at least one slot capable of receiving said at least one engagement pin and at least one recess capable of receiving the extendable part of said at least one ball.

2. The armature winding machine of claim 1 wherein said at least one engagement pin comprises a shoulder having an enlarged head.

3. The armature winding machine of claim 2 wherein said at least one slot comprises a key slot.

4. The armature winding machine of claim 1 wherein said recess is sufficiently large that said ball can enter said recess without applying any pressure to said mounting plate.

5. An armature winding machine comprising a flier assembly, a winding form, and a quick-change winding form assembly for removably mounting said winding form to said flier assembly, said quick-change winding form assembly comprising:

a bearing collar connected to said flier assembly comprising a first engagement surface and having a pair of opposed spring-biased balls, the side surfaces of which are partly extendable from said first engagement surface, and further having a pair of opposed engagement pins extending from said first engagement surface; and a mounting plate connected to said winding form comprising a second engagement surface mutually confronting said first engagement surface and having a pair of opposed arcuate key slots capable of receiving said pair of opposed engagement pins and a pair of opposed recesses in said second engagement surface capable of receiving said opposed balls.

6. The armature winding machine of claim 5 wherein each of said pair of engagement pins comprises a shoulder having an enlarged head.

7. The armature winding machine of claim 6 wherein said pair of arcuate key slots extend through said mounting plate from said second engagement surface to a winding form engagement surface, said slots being relieved on said winding form engagement surface to receive said enlarged heads.

8. The armature winding machine of claim 4 wherein said recesses are sufficiently large that said balls can enter said recesses without applying any pressure to said mounting plate.

* * * * *